United States Patent
Guzman et al.

(10) Patent No.: US 8,402,501 B2
(45) Date of Patent: Mar. 19, 2013

(54) METHOD AND APPARATUS FOR PROGRAMMING A REMOTE CONTROL USING BROADCAST DATA

(75) Inventors: Jorge H. Guzman, Gaithersburg, MD (US); Kim W. Schulze, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1405 days.

(21) Appl. No.: 11/820,532

(22) Filed: Jun. 20, 2007

(65) Prior Publication Data

US 2008/0320542 A1    Dec. 25, 2008

(51) Int. Cl.
*H04N 7/173* (2011.01)
*H04N 5/44* (2011.01)

(52) U.S. Cl. ........................ 725/132; 348/734

(58) Field of Classification Search .................. None
See application file for complete search history.

(56) References Cited

U.S. PATENT DOCUMENTS

| 5,629,868 | A | * | 5/1997 | Tessier et al. ............. 348/164 |
| 6,008,735 | A | * | 12/1999 | Chiloyan et al. ........ 340/825.22 |
| 6,246,400 | B1 | * | 6/2001 | Bush ......................... 715/721 |
| 2004/0123332 | A1 | * | 6/2004 | Hanson ..................... 725/132 |
| 2007/0052547 | A1 | * | 3/2007 | Haughawout et al. ... 340/825.22 |
| 2007/0101367 | A1 | * | 5/2007 | Lee et al. ................... 725/39 |

* cited by examiner

*Primary Examiner* — Dominic D Saltarelli
*Assistant Examiner* — Oschta Montoya

(57) ABSTRACT

A set top box 22 includes a communication module 102 receiving a remote control configuration database having a remote control associated therewith. The set top box 22 further includes a display control module 116 forming a screen display in response to the remote control configuration database. An interface 110 forms selections in response to the screen display and a display control module displays programming instructions for the remote control.

24 Claims, 5 Drawing Sheets

METHOD AND APPARATUS FOR PROGRAMMING A REMOTE CONTROL USING BROADCAST DATA

TECHNICAL FIELD

The present disclosure relates generally to programming a remote control device and, more specifically, to programming a remote control device using broadcast data.

BACKGROUND

The statements in this section merely provide background information related to the present disclosure and may not constitute prior art.

Remote control devices are used for controlling various pieces of electronic equipment. Typically, each piece of electronic entertainment equipment comes with a separate remote control. Some remote control devices may be programmed to perform functions on other electronic devices.

Television set top boxes, such as satellite set top boxes, may include a remote control database to aid a consumer to program a remote control to be used to control various other devices such as televisions, DVD players, and audio systems. As a number of devices increases, the database in the set top box grows continuously taking more space in non-volatile storage. The non-volatile storage used for controlling remote controls are used only a few times and, thus, become wasted space.

The database is loaded into the set top box upon manufacture of the set top box. The database is static. However, the set top box may be used for devices not known at the time of the manufacture of the set top box.

One method for controlling a remote control database includes selecting the device and brand name of the device that are stored in the programming codes in the fixed database. The user programs the remote control with one of the codes and tests the remote control with a desired device. If the device responds, programming is stopped. However, there is a chance that the device may not work and another code may be entered. Several codes may be entered before the proper code for the device is found.

SUMMARY

The present disclosure broadcasts the remote control configuration database. This allows updated information to be provided to the set top box and the remote control for programming.

In one aspect of the disclosure, a method includes receiving a remote control configuration database on a set top box having a remote control associated therewith. The method further includes forming a screen display in response to the remote control configuration database, forming selections at the set top box in response to the screen display and displaying programming instructions to the remote control.

In a further aspect of the disclosure, a set top box includes a communication module receiving a remote control configuration database at a set top box having a remote control associated therewith. The set top box also includes a display control module forming a screen display in response to the remote control configuration database.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
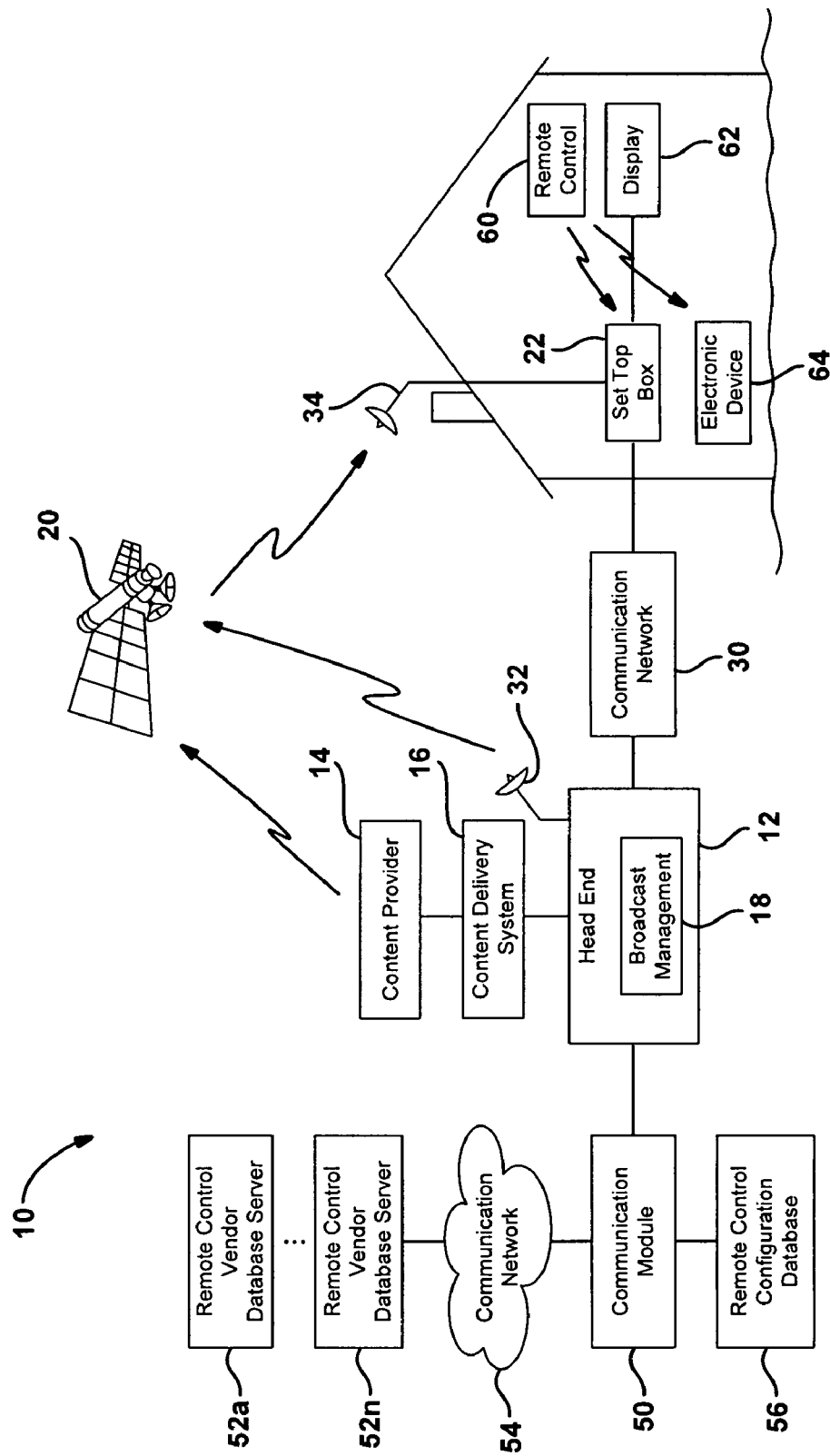
FIG. 1 is a block diagrammatic system double view of the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Referring now to FIG. 1, a communication system 10 includes a head end 12 that is used as a transmission source, a plurality of content providers, one of which is shown as reference numeral 14, and a content delivery system 16. The content providers 14 may deliver content through the content delivery system 16 to the head end 12. The head end 12 may include broadcast management 18 used for broadcasting the content and various other data, such as remote control configuration data as will be described below. A satellite 20 may represent several satellites or a network of satellites. The satellites may be used to communicate the different types of information or portions of content from the head end 12 to a user device such as a set top box 22. The set top box 22 may also be referred to as an integrated receiver decoder. Communications through the satellite 20 may take place at any suitable frequency such as Ka band, Ku band, or both.

In addition to the satellite 20, various types of information, such as security information, encryption and decryption information, content, or remote control configuration database information may be communicated terrestrially. A communication network 30 such as the public switch telephone network, a terrestrial wireless system, a stratospheric platform, an optical fiber, or the like, may be used to terrestrially communicate. In a cable system, all content and the remote control data are communicated terrestrially. Data and content may be communicated through an uplink antenna 32 through the satellite 20 which, in turn, communicates the signals to a receiving antenna 34 in communication with the set top box 22.

A communication module 50 may be in communication with the head end 12. It should be noted that the communication module 50 may be included within the head end or as a separate device. The communication module 50 is used for communicating with a remote control vendor database server 52*a* through 52*n*. The remote control vendor database server will be referred to collectively as 52. The remote control vendor database server 52 includes a database of the remote control devices provided by the particular vendor. This may include the type of device, the model number and brand of the device, as well as programming information such as programming codes. The communication module 50 communicates with the remote control vendors through a communication network 54. The communication network 54 may include the various types of communication means set forth with respect to the communication network 30. The communication network 54 may be differently configured than the communication network 30. That is, the communication network 54 in any configuration may be different than the communication network 30 in an implementation.

The communication module 50 is in communication with the remote control configuration database 56. The communication module 50 may be computer-based such as a server. The remote control configuration database 56 may be a memory within the communication module 50 or within the head end 12. The remote control configuration database 56 is updated periodically through the communication module 50. The communication module 50 may receive a notification that the remote control vendor database of a particular remote control vendor has been updated. The communication module 50 may then retrieve the information. The remote control vendor database server 52 may also periodically send updates to the communication module 50 automatically. As is evident, various ways for receiving and updating the remote control configuration database 56 may be performed.

The set top box 22 is in communication with a remote control device 60 and a display 62. The remote control 60 may be infrared, RF or another type of remote control. The display 62 may be a television monitor, computer monitor, portable media player or other types of display device.

An electronic device 64, such as a television, VCR, DVD player, audio system, or the like, may have a remote control input that may be desirable to be controlled by the remote control 60. The present disclosure sets forth a method to allow the remote control 60 to be programmed to operate one or more electronic devices 64.

Figure 2:
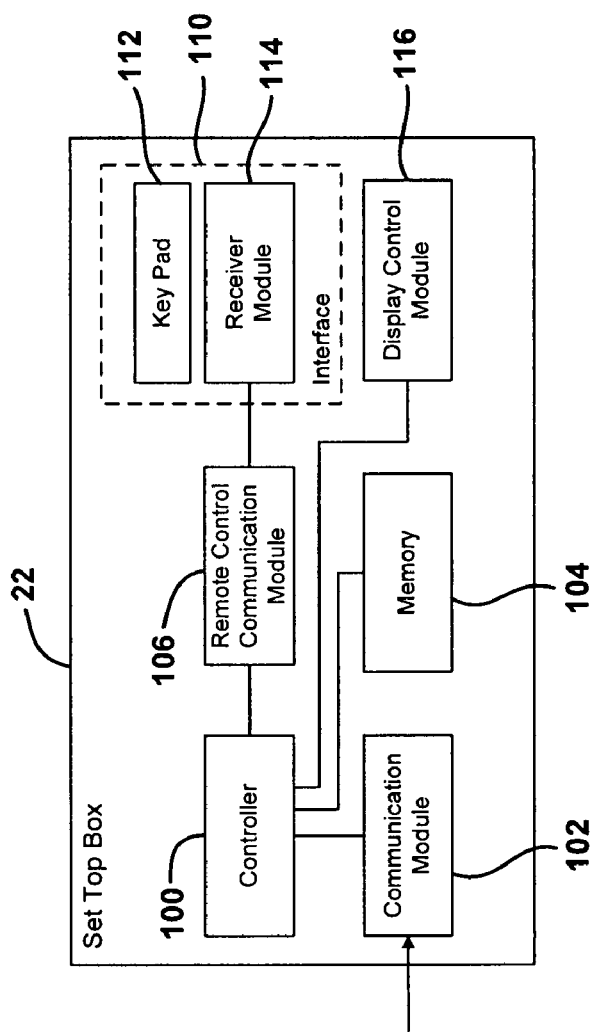
FIG. 2 is a block diagrammatic view of the set top box according to the present disclosure.

Referring now to FIG. 2, set top box 22 is illustrated in further detail. Set top box 22 includes a controller 100 that is in communication with a communication module 102. The communication module 102 is used to communicate through the communication network 30 or the satellite 20, or both. Communication module 102 may be used to receive various types of information such as the remote control communication database and other content.

The controller 100 may store the remote control communication database within the memory 104. The memory 104 may include various types of memory, including a flash memory. However, only portions of the database, rather than the entire database, need to be stored in the memory 104.

The communication module 102 is capable of monitoring the data and retrieving the data according to the remote control communications module 106. The remote control communications module 106 is used to control the programming of the remote control through the set top box 22.

The remote control communication module 106 is in communication with an interface 110 that may include a key pad 112 directly on the set top box or a receiver module 114, or both. The receiver module 114 may include an RF or infrared interface for communicating with the remote control device.

The controller 100 may also be coupled to a display control module 116. The display control module 116 may operate in response to the remote control communication module. That is, various screen displays may be generated for the programming of the remote control device. This allows the user to interact with the set top box 22 for the programming. The remote control communication module may be activated using a screen display for configuring the remote control. Once the remote control process is activated through the interface 110, various screen display may be generated through the display control module 116. Selections by the interface module 110 will control the communications module 102 to obtain various information from the broadcasted remote control configuration database. The operation of the set top box 22 will be more evident in FIGS. 4 and 5.

Figure 3:
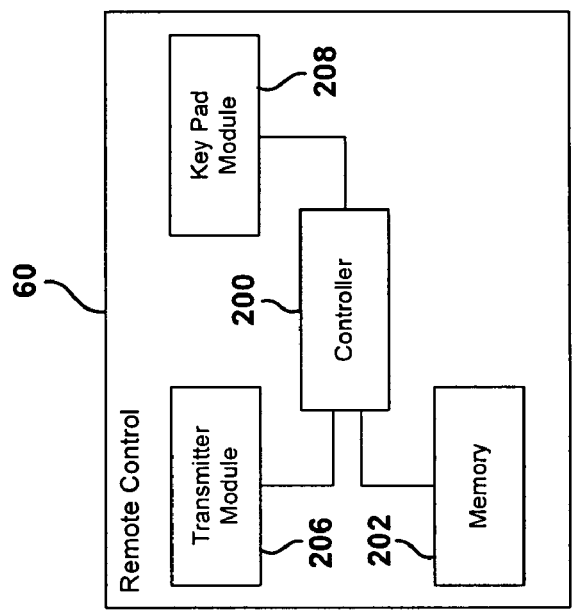
FIG. 3 is a block diagrammatic view of a remote control according to the present disclosure.

Referring now to FIG. 3, a remote control 60 is illustrated in further detail. The remote control 60 may also include a controller 200 that is coupled to a memory 202. The memory 202 may store various configuration information received from the set top box 22. The controller 200 may be used to control the transmitter module 206. The transmitter module may be used to transmit RF or infrared signals to the interface 110 of the set top box 22. A keypad module 208 generates various signals that are communicated through the transmitter module 206 and, ultimately, to the interface 110. The memory 202 may include a database of various types of configurations for the remote control. The keypad module 208, as described below, may be used to configure the remote control 60 to a particular configuration within the remote control database within the memory 202.

Figure 4A:
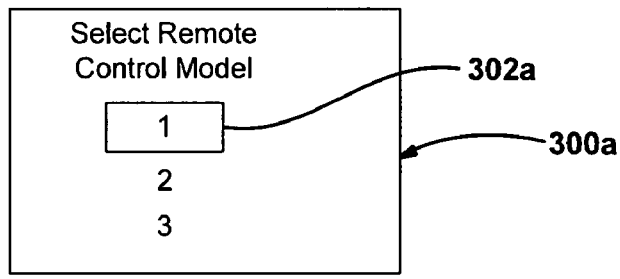
FIGS. 4a-4e are screen displays of various aspects of programming a remote control device.

Referring now to FIG. 4*a*, a screen display 300*a* is illustrated. The screen display 300*a* may ultimately include various instructions and selections for programming a remote control device. The screen display 300*a* may be generated by the display control module 116 of FIG. 2. A selection box 302*a* may also be included on the screen display 300*a*. The selection box 302*a* may be moved in various directions in response to inputs from the keypad module 208 of the remote control 60. In this example, three different types of electronic devices are illustrated. Various numbers of different types of devices may be set forth on the display 300*a*. In this example, a television is selected.

Figure 4B:
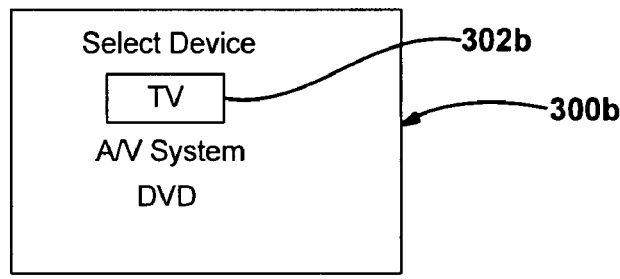

Referring now to FIG. 4*b*, in this example, three different types of remote devices are illustrated on display 300*b*. Various numbers of different types of devices may be set forth on the display 300*b*. In this example, a type 1 is selected.

Figure 4C:
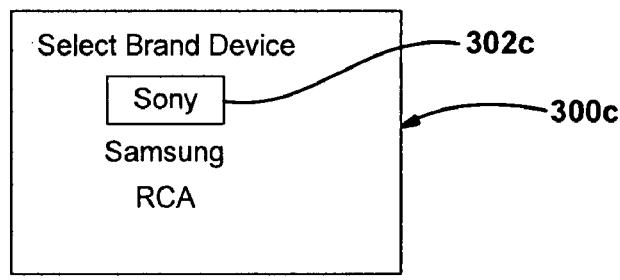

Referring now to FIG. 4c, the communications module 102 and the set top box 22 may then receive information on various brands of TVs being broadcast in the remote control configuration database. The display 300c provides prompts for selecting various brands. Again, a selection box 302c is illustrated for selecting the type of brand.

Figure 4D:
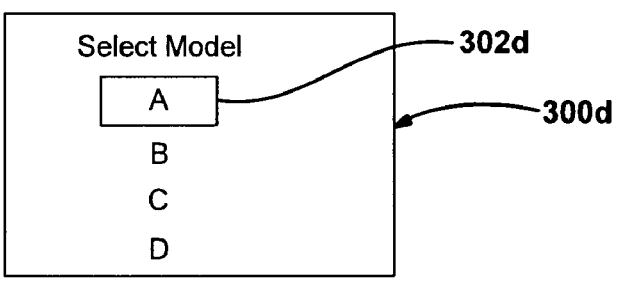

Referring now to FIG. 4d, a screen display 300d illustrating various types of models is illustrated. Numerous models may be available for any particular manufacturer. In this example, model A is selected by the selection box 302d.

Figure 4E:
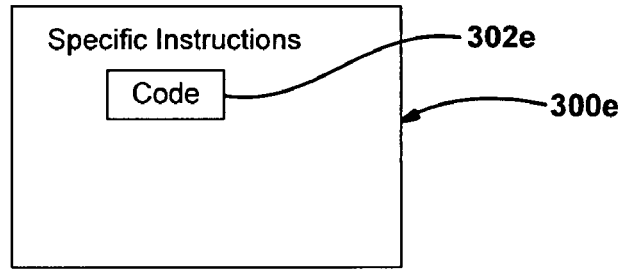

Referring now to FIG. 4e, specific instructions in response to the selected module are displayed on the display 300e. The specific instructions may include a code 310 used for selecting a particular configuration within the remote control device. As will be described below, when moving from display-to-display, various information may be selected from the continually-broadcast remote control configuration database. The information received will be used to populate the screen display.

Figure 5:
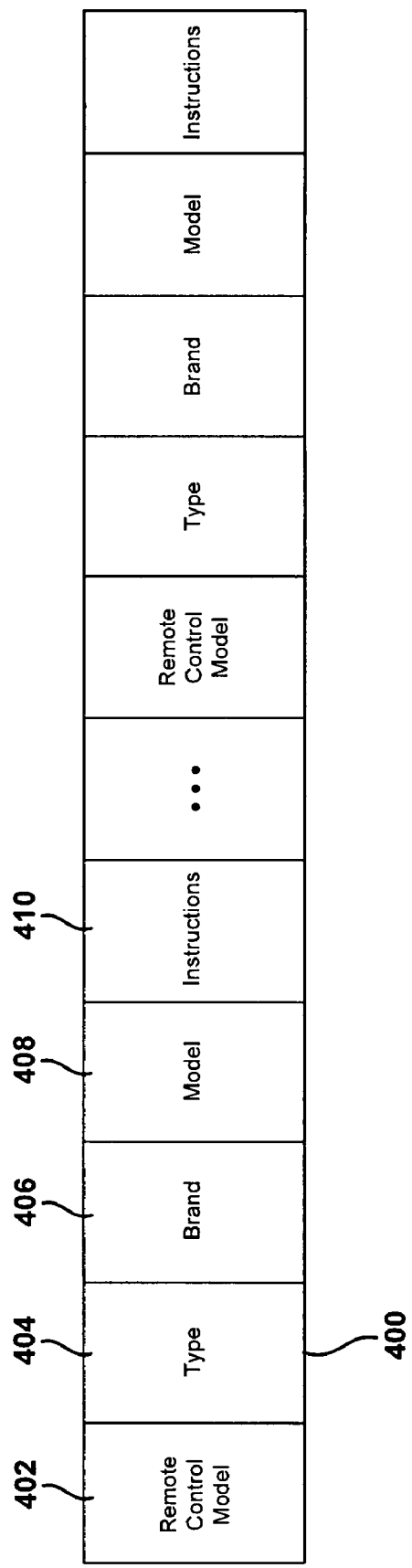
FIG. 5 is a diagrammatic view of a broadcast remote control configuration database.

Referring now to FIG. 5, a portion of a broadcast stream having the remote control configuration database 400 is illustrated. The remote control configuration database may be broadcast in a carousel-type manner. That is, the data may continuously be broadcast a lower speed than that of normal content. Various types of information may be broadcast, including remote control model 402, device type information 404, brand information 406, model information 408, and instruction information 410. This information may be repeated for various brands, types, and models. As mentioned above, this may be broadcast continually to allow the set top box to receive the information required to form the various displays described above in FIG. 4. In this manner, the whole remote control database is not required to be stored within the set top box, thus freeing up memory for other purposes. Updates may be periodically inserted in the broadcast data stream.

Figure 6:
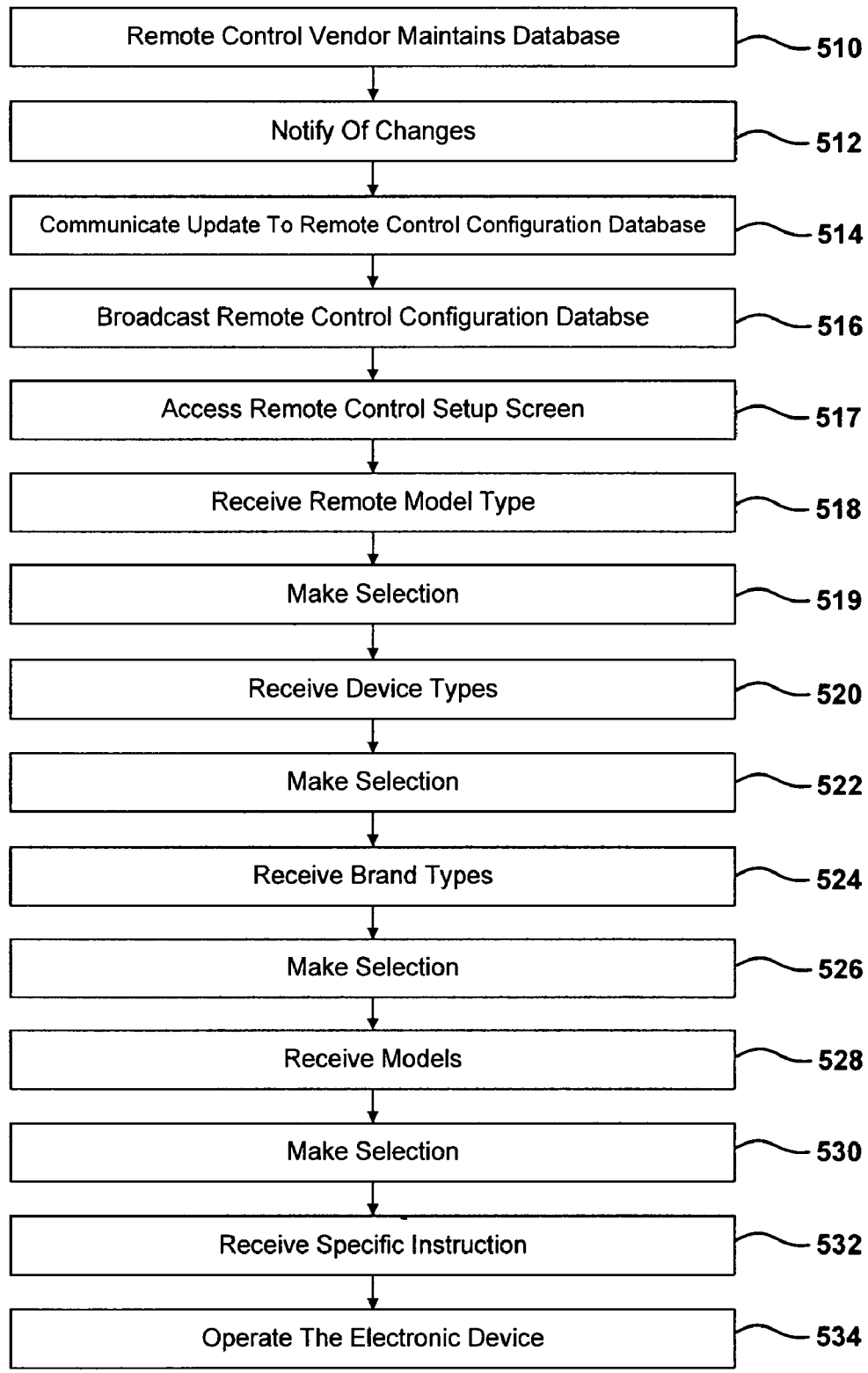
FIG. 6 is a flowchart illustrating a method for operating the present disclosure.

Referring now to FIG. 6, one method for operating the remote control configuration system is set forth. In step 510, as new products are developed the database is updated. The product vendor, remote control suppliers for the product vendors or other may update the database. In step 512, notification may be performed that changes have been made to the database. The presence of the changes may be communicated to the communication module 50 illustrated in FIG. 1.

In step 514, the updates to the remote control database may be communicated from the vendor server to the database. This may be instigated periodically at the communication module 50 illustrated in FIG. 1 or upon receipt of a notification such as that in step 512.

In step 516, the remote control configuration database is broadcast in a continual manner from the head end 12. The broadcast management module 18 may be used to control the broadcasting of the remote control configuration database.

When the remote control configuration database is updated, the updates are automatically inserted into the carousel for broadcasting the remote control database.

In step 517, the remote control set-up screen is accessed by a user by activating one of the interfaces 110 illustrated in FIG. 2. The remote control set-up screen may be accessed through selections on the remote control or on a key pad on the set top box. In step 518, the remote control model types are received. In step 519, a selection of the model type is performed. In step 520, various device types may be received through the broadcast remote control configuration database. Once the types of device are received, a selection may be made using one of the interfaces in step 522. Upon selection of the device type, the brand types may be received and displayed on the display in step 524. In step 526, a selection is made for the type of brand. The set top box then receives the remote control configuration database portions corresponding to the models. In step 528, the model identifiers are provided on the display. In step 530, a model is selected. In step 532, specific instructions may be received in response to the specific model. For example, various instructions may include depressing certain buttons or entering certain codes. Once the remote control device is programmed, the remote control may be used to operate the electronic device. As can be seen, the remote control may also be programmed for various numbers of devices if desired. Known types of selector switches may be provided for selecting audio, visual, TVs, and the like on various types of remote controls. Each selection may be programmed separately.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of programming a remote control associated with a set top box comprising:
   continually broadcasting a remote control configuration database;
   receiving a first portion of a remote control configuration database at the set top box having a first instruction associated therewith;
   forming a first screen display in response to the first portion of the remote control configuration database and the first instruction;
   forming a first selection at the set top box in response to the screen display;
   thereafter, receiving a second portion of the remote control configuration database at the set top box having a second instruction in response to the first selection;
   forming a second screen display in response to the second portion of the remote control configuration database and the second instruction;
   thereafter, displaying programming instructions for the remote control; and
   operating the set top box with the remote control.

2. A method as recited in claim 1 wherein broadcasting comprises broadcasting the database in a carousel format.

3. A method as recited in claim 1 wherein further comprising broadcasting content at a first data rate and wherein broadcasting a remote control configuration comprises broadcasting the remote control configuration at a second data rate less than the first data rate.

4. A method as recited in claim 1 further comprising prior to broadcasting a remote control configuration database, communicating a notification of changes for configuration updates to the remote control configuration database.

5. A method as recited in claim 1 wherein broadcasting comprises broadcasting the remote control configuration database through a satellite.

6. A method as recited in claim 1 wherein broadcasting comprises broadcasting the remote control configuration database through a terrestrial communication network.

7. A method as recited in claim 6 wherein the terrestrial communication network comprises an optical fiber.

8. A method as recited in claim 6 wherein the terrestrial communication network comprises a broadband network.

9. A method as recited in claim 6 wherein the terrestrial communication network comprises a telephone network.

10. A method as recited in claim 6 wherein the terrestrial communication network comprises a wireless network.

11. A method as recited in claim 1 wherein prior to receiving a first portion, entering a remote control programming mode.

12. A method as recited in claim 1 wherein forming a first selection at the set top box comprises forming the first selection at the set top box using the remote control.

13. A method as recited in claim 1 wherein displaying comprises displaying a code.

14. A method as recited in claim 13 further comprising entering the code into the remote control prior to operating the set top box with the remote control.

15. A method as recited in claim 1 wherein forming a second screen display comprises forming a second screen display in response to the remote control configuration database and the first selection.

16. A method as recited in claim 1 wherein one of the first screen display or second screen display corresponds to a device type.

17. A method as recited in claim 1 wherein one of the first screen display or second screen display corresponds to a brand type.

18. A method as recited in claim 1 wherein one of the first screen display or second screen display corresponds to a model type.

19. A set top box having a remote control associated therewith comprising:

a communication module receiving a first portion of a continually broadcasted remote control configuration database having a first instruction associated therewith at the set top box;

a display control module forming a first screen display in response to the first portion of the remote control configuration database and the first instruction;

a remote control communication module receiving a first selection signal in response to the first screen display;

said communication module receiving a second portion of the remote control communication database having a second instruction associated therewith after receiving the first selection signal; and the display control module forming a second screen display in response to the second portion and the second instruction and displaying programming instructions for the remote control configuration database.

20. A system comprising:

the set top box as recited in claim 19;

a display in communication with the set top box; and the remote control device.

21. A system as recited in claim 20 wherein the set top box comprises a satellite television set top box.

22. A system as recited in claim 20 further comprising a head end continually broadcasting the remote control configuration database.

23. A system as recited in claim 20 further comprising a head end broadcasting the remote control configuration database in a carousel format.

24. A system as recited in claim 20 further comprising a remote control vendor database communicating remote control information to a remote control configuration database.

* * * * *